United States Patent [19]

Hormadaly

[11] Patent Number: 4,539,223

[45] Date of Patent: * Sep. 3, 1985

[54] THICK FILM RESISTOR COMPOSITIONS

[75] Inventor: Jacob Hormadaly, Wilmington, Del.

[73] Assignee: E. I. Du Pont de Nemours and Company, Wilmington, Del.

[*] Notice: The portion of the term of this patent subsequent to Oct. 9, 2001 has been disclaimed.

[21] Appl. No.: 683,634

[22] Filed: Dec. 19, 1984

[51] Int. Cl.$^3$ .............................................. B05D 5/12
[52] U.S. Cl. .................................. 427/102; 427/126.2; 427/126.3; 427/126.5; 427/126.6; 427/376.2; 252/518; 252/519; 252/521; 338/20; 338/22 R; 338/308; 29/620; 106/1.24; 106/1.27
[58] Field of Search .............. 252/518, 519, 521, 514; 106/1.24, 1.27; 338/20, 22 R, 307, 308; 427/101, 102, 126.1, 126.2, 126.5, 126.6, 375, 376.2, 383.3, 383.5, 385.5, 279; 428/432, 434, 209, 210, 901, 469, 472, 701

[56] References Cited

U.S. PATENT DOCUMENTS

| | | | |
|---|---|---|---|
| 3,560,410 | 2/1971 | Schubert | 252/518 |
| 3,583,931 | 6/1971 | Bouchard | 252/520 |
| 4,163,706 | 8/1979 | Horowitz et al. | 252/518 |
| 4,175,061 | 11/1979 | Tsymura | 252/518 |
| 4,203,871 | 5/1980 | Horowitz et al. | 252/518 |
| 4,225,468 | 9/1980 | Donohue et al. | 252/521 |
| 4,225,469 | 9/1980 | Horowitz et al. | 252/518 |
| 4,302,362 | 11/1981 | Hoffman et al. | 252/518 |
| 4,312,770 | 1/1982 | Nyu et al. | 252/519 |
| 4,362,656 | 12/1982 | Hormadaly | 252/518 |
| 4,439,352 | 3/1984 | Hsada et al. | 252/518 |
| 4,476,039 | 10/1984 | Hormadaly | 252/519 |

*Primary Examiner*—Josephine L. Barr

[57] ABSTRACT

Resistor composition comprising an admixture of finely divided particles of (a) ruthenium-based conductive material, (b) inorganic binder and (c) cobalt ruthenate.

8 Claims, No Drawings

THICK FILM RESISTOR COMPOSITIONS

FIELD OF INVENTION

The invention is directed to compositions which are useful for making thick film resistors and particularly to such compositions in which the conductive phase is ruthenium based.

BACKGROUND OF THE INVENTION

Thick film materials are mixtures of metal, glass and/or ceramic powders dispersed in an organic vehicle. These materials are applied to nonconductive substrates to form conductive, resistive or insulating films. Thick film materials are used in a wide variety of electronic and light electrical components.

The properties of individual compositions depend on the specific constituents which comprise the compositions. All compositions contain three major components. The conductive phase determines the electrical properties and influences the mechanical properties of the final film. In conductor compositions, the conductive phase is generally a precious metal or mixture of precious metals. In resistor compositions the conductive phase is generally a metallic oxide. In dielectric compositions, the functional phase is generally a glass or ceramic.

The binder is usually a glass, a crystalline oxide or a combination of the two. The binder holds the film together and to the substrate. The binder also influences the mechanical properties of the final film.

The vehicle is a solution of polymers in organic solvents. The vehicle determines the application characteristics of the composition.

In the composition, the functional phase and binder are generally in powder form and have been thoroughly dispersed in the vehicle.

Thick film materials are applied to a substrate. The substrate serves as a support for the final film and may also have an electrical function, such as a capacitor dielectric. Substrate materials are generally nonconducting.

The most common substrate materials are ceramics. High-purity (generally 96%) aluminum oxide is the most widely used. For special applications, various titanate ceramics, mica, beryllium oxide and other substrates are used. These are generally used because of specific electrical or mechanical properties required for the application.

In some applications where the substrate must be transparent such as displays glass is used.

Thick film technology is defined as much by the processes as by the materials or applications. The basic thick film process steps are screen printing, drying and firing. The thick film composition is generally applied to the substrate by screen printing. Dipping, banding, brushing or spraying are occasionally used with irregular shaped substrates.

The screen printing process consists of forcing the thick film composition through a stencil screen onto the substrate with a squeegee. The open pattern in the stencil screen defines the pattern which will be printed onto the substrate.

After printing, the film is dried and fired—generally in air at a peak temperature of 500° 1000° C. This process forms a hard, adherent film with the desired electrical and mechanical properties.

Additional thick film compositions may be applied to the same substrate by repeating the screen printing, drying and firing processes. In this way, complex, interconnected conductive, resistive and insulating films can be generated.

Thick film resistor compositions are usually produced in decade resistance values and materials are available that provide a wide range of sheet resistance to $0.5\Omega/\square$ to $1 \times 10^9 \Omega/\square$). A change in length to width aspect ratio of a resistor will provide resistance values lower than $0.5\Omega/\square$ and higher than $1 \times 10^9 \Omega/\square$ and any intermediate resistance value.

Composition blending is a technique widely used to obtain resistance value between standard decade values. Adjacent decade members can be mixed in all proportions to produce intermediate values of sheet resistance. The mixing procedure is simple but requires care and the proper equipment. Usually blending has minimal effect on Temperature Coefficient of Resistance.

High stability and low process sensitivity are critical requirements for thick film resistor compositions for microcircuit applications. In particular it is necessary that resistivity (R) of the films be stable over a wide range of temperature conditions. Thus, the Thermal Coefficient of Resistance (TCR) is a critical variable in any thick film resistor composition. Because thick film resistor compositions are comprised of a functional or conductive phase and a permanent binder phase the properties of the conductive and binder phases and their interactions with each other and with the substrate affect both resistivity and TCR.

Functional phases based on ruthenium chemistry form the core of conventional thick film resistor compositions.

Ruthenium compounds based on the pyrochlore family have a cubic structure with each ruthenium atom surrounded by six oxygen atoms, forming an octahedron. Each oxygen atom is shared by one other octahedron to form a three-dimensional network of $Ru_2O_6$ stoichiometry. The open areas within this framework are occupied large cations and additional anions. A wide range of substitution in this secondary lattice is possible which makes for a great deal of chemical flexibility. The pyrochlore structure with the general formula $A_2B_2O_{6-7}$ is such a flexible structure, pyrochlores which behave as metals, semiconductors or insulators can be obtained through controlled substitution on available crystallographic sites. Many current pyrochlore based thick film resistors contain $Bi_2Ru_2O_7$ as the functional phase.

Ruthenium dioxide is also used as the conductive phase in thick film resistor compositions. Its rutile crystal structure is similar to that of pyrochlore in that each ruthenium atom is surrounded by six equidistant oxygen atoms forming an octohedron. However, in the rutile structure each oxygen is shared by 3 octahedra. This results in a complex three-dimensional network in which, in contrast to the case of pyrochlore, chemical substitution is very limited.

In the formulation of thick film resistor compositions for particular applications, it is often found that the TCR for the anticipated temperature range in use is too high and it therefore becomes necessary to increase or reduce the TCR in order that the resistivity not change too much over the operating range of temperature. It is well known in the thick film resistor art that additions of small amounts of various inorganic compounds will accomplish this. For example, in ruthenium-based resistors it is known to employ for this purpose $CdO$, $Nb_2O_5$, $TiO_2$, $Mn_2O_3$, $V_2O_5$, $NiO$, $Sb_2O_3$ and $Sb_2O_5$, all of which are negative TCR "drivers". That is, they reduce TCR. On the other hand $CuO$ is known as a positive TCR driver in ruthenium-based resistors.

In the usual formulation of resistors, it is found that negative TCR drivers lower TCR, but simultaneously raise resistivity (R). Conversely, positive TCR drivers raise TCR but lower resistivity.

A recurrent problem with the use of the prior art materials used as negative TCR drivers is that the resistivity of the resistors in which they are used is raised excessively when the desired level of TCR reduction is obtained. This is a disadvantage because it necessitates the inclusion of additional conductive phase metals to obtain the same resistivity level. In turn, the inclusion of additional conductive phase adversely affects the resistance stability of the fired resistor with respect to time.

More recently, applicant in U.S. Pat. No. 4,362,656 disclosed the use of various manganese vanadates as TCR drivers in ruthenium-based resistors. These materials are unique in that they are effective to lower TCR without significantly raising resistivity (R). However, when they are used in concentrations above about 10 wt. %, the laser trim stability of the resistor formed therefrom tends to suffer. That is, the drift in resistance after laser trimming becomes too high.

Therefore, there remains a need for a negative TCR driver which does not either appreciably raise resistivity or adversely effect laser trim stability.

BRIEF DESCRIPTION OF THE INVENTION

The disadvantages of prior art TCR drivers are overcome in ruthenium-based resistors by the use therein of cobalt ruthenate ($Co_2RuO_4$) as a TCR driver.

The invention is therefore directed to a resistor composition which is an admixture of finely divided particles of (a) ruthenium-based compound(s), (b) inorganic binder; and (c) $Co_2RuO_4$ dispersed in an appropriate organic medium.

In a second aspect the invention is directed to a resistor comprising a thin layer of the above-described dispersion which has been fired to remove the inert organic medium and to effect liquid phase sintering of the glass and then cooled.

In a third aspect, the invention is directed to a thermistor comprising an admixture of finely divided particles of $Co_2RuO_4$ and inorganic binder dispersed in an organic medium.

DETAILED DESCRIPTION OF THE INVENTION

A. Ruthenium Component

The invention is directed to resistors in which the principal conductive phase is ruthenium based. At the present state of the art of ruthenium-based resistors, this is known to include $RuO_2$ and ruthenium compounds corresponding to the formula $(M_cBi_{2-c})(M'_dRu_{2-d})O_{7-e}$, wherein M is at least one of the group consisting of yttrium, thallium, indium, cadmium, lead and the rare earth metals of atomic number 57–71, inclusive:

M' is at least one of platinum, titanium, chromium, rhodium and antimony;

c is a number in the range 0 to 2;

d is a number in the range 0 to about 0.5, provided that d is a number in the range 0 to 1 when M' is rhodium or more than one of platinum, and titanium; and e is a number in the range 0 to 1, being at least equal to about c/2 when M is divalent lead or cadmium.

These compounds and their preparation are disclosed in U.S. Pat. No. 3,583,931 to Bouchard and also in German patent application OS No. 1,816,105.

The particle size of the above-described active materials is not narrowly critical from the standpoint of their technical effectiveness in the invention. However, they should, of course, be of a size appropriate to the manner in which they are applied, which is usually screen printing, and to the firing conditions. Thus the metallic material should be no bigger than 10 μm and preferably should be below about 5 μm. As a practical matter, the available particle size of the metals is as low as 0.1 μm. It is preferred that the ruthenium component have an average surface area of at least 5 m$^2$/g and still more preferably at least 8 m$^2$/g.

Preferred ruthenium compounds include $BiPbRu_2O_{6.5}$, $Bi_{0.2}Pb_{1.8}Ru_2O_{6.1}$, $Bi_2Ru_2O_7$, $Pb_2Ru_2O_6$ and $RuO_2$. In addition, precursors of $RuO_2$, that is ruthenium compounds which upon firing will form $RuO_2$, are suitable for use in the invention, as are mixtures of any of these materials as well. Exemplary of suitable nonpyrochlore $RuO_2$ precursors are ruthenium metal, ruthenium resinates, $BaRuO_3$, $Ba_2RuO_4$, $CaRuO_3$, $LaRuO_3$, and $Li_2RuO_3$.

The resistor compositions may contain 4–75, wt. of the ruthenium-based component, it is preferred that they contain 10 to 60%.

B. Cobalt Ruthenate Component

The cobalt ruthenate material will ordinarily be used at a concentration of from 0.05 to 15% by weight of the composition solids. However, 0.05 to 5% and especially 1 to 5% are preferred.

It is preferred that the cobalt ruthenate have a high surface area since the material is more efficient in its function as a TCR driver when the surface area is high. A surface area of at least 0.5 m$^2$/gm is preferred. Typically, the $Co_2RuO_4$ material used in the invention has a surface area of about 0.8 m$^2$/gm.

Cobalt ruthenate is made quite simply by (1) firing an aqueous dispersion of $CO_3O_4$ and $RuO_2$, (2) drying the dispersion and then (3) firing the dried dispersion in air at a temperature of at least about 850° C. to form the cobalt ruthenate.

It will ordinarily be preferred to use approximately stoichiometric amounts of the $Co_3O_4$ and $RuO_2$. However, small excesses of the $RuO_2$ are not at all harmful to the effectiveness of the cobalt ruthenate material. It should be noted that when the reaction is carried out in an alumina vessel, a small amount of $CoAl_2O_4$ may be formed. However, this can easily be avoided by using a reaction vessel made of platinum or other more inert material.

As is the case for the ruthenate component of the invention, the particle size of the cobalt ruthenate is not narrowly critical, but should be of size appropriate to the manner in which the composition is applied.

C. Inorganic Binder

The glass frit used in the resistance material of the present invention may be of any well-known composition which has a melting temperature below that of the cobalt ruthenate. The glass frits most preferably used are the borosilicate frits, such as lead borosilicate frit, bismuth, cadmium, barium, calcium or other alkaline earth borosilicate frits. The preparation of such glass frits is well-known and consists, for example, in melting together the constituents of the glass in the form of the oxides of the constituents, and pouring such molten composition into water to form the frit. The batch ingredients may, of course, be any compound that will yield the desired oxides under the usual conditions of frit production. For example, boric oxide will be obtained from boric acid, silicon dioxide will be produced from flint, barium oxide will be produced from barium carbonate, etc. The glass is preferably milled in a ball-mill with water to reduce the particle size of the frit and to obtain a frit of substantially uniform size.

The glasses are prepared by conventional glass-making techniques, by mixing the desired components in the desired proportions and heating the mixture to form a melt. As is well-known in the art, heating is conducted to a peak temperature and for a time such that the melt becomes entirely liquid and homogeneous. In the present work, the components are premixed by shaking in a polyethylene jar with plastic balls and then melted in a platinum crucible at the desired temperature. The melt is heated at the peak temperature for a period of 1–1½ hours. The melt is then poured into cold water. The maximum temperature of the water during quenching is kept as low as possible by increasing the volume of water to melt ratio. The crude frit after separation from water, is freed from residual water by drying in air or by displacing the water by rinsing with methanol. The crude frit is then ball-milled for 3–5 hours in alumina containers using alumina balls. Alumina picked up by the materials, if any, is not within the observable limit as measured by X-ray diffraction analysis.

After discharging the milled frit slurry from the mill, the excess solvent is removed by decantation and the frit powder is air-dried at room temperature. The dried powder is then screened through a 325 mesh screen to remove any large particles.

The major two properties of the frit are: it aids the liquid phase sintering of the inorganic crystalline particulate matters; and form noncrystalline (amorphous) or crystalline materials by devitrification during the heating-cooling cycle (firing cycle) in the preparation of thick film resistors. This devitrification process can yield either a single crystalline phase having the same composition as the precursor noncrystalline (glassy) material or multiple crystalline phases with different compositions from that of the precursor glassy material.

D. Organic Medium

The inorganic particles are mixed with an essentially inert liquid medium (vehicle) by mechanical mixing (e.g., on a roll mill) to form a paste-like composition having suitable consistency and rheology for screen printing. The latter is printed as a "thick film" on conventional dielectric substrates in the conventional manner.

Any inert liquid may be used as the vehicle. Various organic liquids, with or without thickening and/or stabilizing agents and/or other common additives, may be used as the vehicle. Exemplary of organic liquids which can be used are the aliphatic alcohols, esters of such alcohols, for example, acetates and propionates, terpenes such as pine oil, terpineol and the like, solutions of resins such as the polymethacrylates of lower alcohols, and solutions of ethyl cellulose in solvents such as pine oil, and the monobutyl ether of ethylene glycol monoacetate. A preferred vehicle is based on ethyl cellulose and beta terpineol. The vehicle may contain volatile liquids to promote fast setting after application to the substrate.

The ratio of vehicle to solids in the dispersions can vary considerably and depends upon the manner in which the dispersion is to be applied and the kind of vehicle used. Normally to achieve good coverage the dispersions will contain complementally, 60–90% solids and 40–10% vehicle. The compositions of the present invention may, of course, be modified by the addition of other materials which do not affect its beneficial characteristics. Such formulation is well within the skill of the art.

The pastes are conveniently prepared on a three-roll mill. The viscosity of the pastes is typically within the following ranges when measured on a Brookfield HBT viscometer at low, moderate and high shear rates:

| Shear Rate (Sec$^{-1}$) | Viscosity (Pa · s) |
| --- | --- |
| 0.2 | 100–5000 |
|  | 300–2000 Preferred |
|  | 600–1500 Most preferred |
| 4 | 40–400 |
|  | 100–250 Preferred |
|  | 140–200 Most preferred |
| 384 | 7–40 — |
|  | 10–25 Preferred |
|  | 12–18 Most Preferred |

The amount of vehicle utilized is determined by the final desired formulation viscosity.

FORMULATION AND APPLICATION

In the preparation of the composition of the present invention, the particulate inorganic solids are mixed with the organic carrier and dispersed with suitable equipment, such as a three-roll mill, to form a suspension, resulting in a composition for which the viscosity will be in the range of about 100–150 pascal-seconds at a shear rate of 4 sec$^{-1}$.

In the examples which follow, the formulation was carried out in the following manner:

The ingredients of the paste, minus about 5% organic components equivalent to about 5% wt., are weighed together in a container. The components are then vigorously mixed to form a uniform blend; then the blend is passed through dispersing equipment, such as a three roll mill, to achieve a good dispersion of particles. A Hegman gauge is used to determine the state of dispersion of the particles in the paste. This instrument consists of a channel in a block of steel that is 25 μm deep (1 mil) on one end and ramps up to 0" depth at the other end. A blade is used to draw down paste along the length of the channel. Scratches will appear in the channel where the agglomerates' diameter is greater than the channel depth. A satisfactory dispersion will give a fourth scratch point of 10–18 typically. The point at which half of the channel is uncovered with a well dispersed paste is between 3 and 8 typically. Fourth scratch measurement of >20 μm and "half-channel" measurements of >10 μm indicate a poorly dispersed suspension.

The remaining 5% consisting of organic components of the paste is then added, and the resin content is adjusted to bring the viscosity when fully formulated to between 140 and 200 Pa.s at a shear rate of 4 sec$^{-1}$. The composition is then applied to a substrate, such as alumina ceramic, usually by the process of screen printing, to a wet thickness of about 30–80 microns, preferably 35–70 microns, and most preferably 40–50 microns. The electrode compositions of this invention can be printed onto the substrates either by using an automatic printer or a hand printer in the conventional manner, preferably automatic screen stencil techniques are employed using a 200 to 325 mesh screen. The printed pattern is then dried at below 200° C., about 150° C., for about 5–15 minutes before firing. Firing to effect sintering of both the inorganic binder and the finely divided particles of metal is preferably done in a well ventilated belt conveyor furnace with a temperature profile that will allow burnout of the organic matter at about 300°–600° C., a period of maximum temperature of about 800°–950° C. lasting about 5–15 minutes, followed by a controlled cooldown cycle to prevent over-sintering, unwanted chemical reactions at intermediate temperatures or substrate fracture which can occur from too rapid cooldown. The overall firing procedure will preferably extend over a period of about 1 hour, with 20–25 minutes to reach the firing temperature, about 10 minutes at the firing temperature, and about 20–25 minutes in cooldown. In some instances total cycle times as short as 30 minutes can be used.

SAMPLE PREPARATION

Samples to be tested for Temperature Coefficient of Resistance (TCR) are prepared as follows:

A pattern of the resistor formulation to be tested is screen printed upon each of ten coded Alsimag 614 1×1″ ceramic substrates, and allowed to equilibrate at room temperature and then dried at 150° C. The mean thickness of each set of dried films before firing must be 22–28 microns as measured by a Brush Surfanalyzer. The dried and printed substrate is then fired for about 60 minutes using a cycle of heating at 35° C. per minute to 850° C., dwell at 850° C. for 9 to 10 minutes and cooled at a rate of 30° C. per minute to ambient temperature.

RESISTANCE MEASUREMENT AND CALCULATIONS

The test substrates are mounted on terminal posts within a controlled temperature chamber and electrically connected to a digital ohm-meter. The temperature in the chamber is adjusted to 25° C. and allowed to equilibrate after which the resistance of each substrate is measured and recorded.

The temperature of the chamber is then raised to 125° C. and allowed to equilibrate, after which the resistance of the substrate is again measured and recorded.

The temperature of the chamber is then cooled to −55° C. and allowed to equilibrate and the cold resistance measured and recorded.

The hot and cold temperature coefficients of resistance (TCR) are calculated as follows:

$$\text{Hot } TCR = \frac{R_{125°C.} - R_{25°C.}}{R_{25°C.}} \times (10,000) \text{ ppm/°C.}$$

$$\text{Cold } TCR = \frac{R_{-55°C.} - R_{25°C.}}{R_{25°C.}} \times (-12,500) \text{ ppm/°C.}$$

The values of $R_{25°C.}$ and Hot and Cold TCR are averaged and $R_{25°C.}$ values are normalized to 25 microns dry printed thickness and resistivity is reported as ohms per square at 25 microns dry print thickness. Normalization of the multiple test values is calculated with the following relationship:

$$\text{Normalized Resistance} = \frac{\text{Avg. measured resistance} \times \text{Avg. dry print thickness, microns}}{25 \text{ microns}}$$

LASER TRIM STABILITY

Laser trimming of thick film resistors is an important technique for the production of hybrid microelectronic circuits. [A discussion can be found in *Thick Film Hybrid Microcircuit Technology* by D. W. Hamer and J. V. Biggers (Wiley, 1972) p. 173ff.] Its use can be understood by considering that the resistances of a particular resistor, printed with the same resistive ink on a group of substrates, have a Gaussian-like distribution. To make all the resistors have the same design value for proper circuit performance, a laser is used to trim resistances up by removing (vaporizing) a small portion of the resistor material. The stability of the trimmed resistor is then a measure of the fractional change (drift) in resistance that occurs after laser trimming. Low resistance drift—high stability is necessary so that the resistance remains close to its design value for proper circuit performance.

With the exception of Examples 3–6, the inorganic binder used in the examples, a glass frit, was composed by weight of 65% PbO, 34% $SiO_2$ and 1% $Al_2O_3$.

EXAMPLES

Example 1

A dispersion in distilled water was formed from 16.05 g of finely divided $Co_3O_4$ and 13.31 g of $RuO_2$ and heated to remove substantially all of the water. The dried material was then placed in an alumina crucible and heated to 871° C. for 12 hours, after which the material was ground to effect size reduction. The ground reaction product was then fired for 15 hours at 1100° C. When the twice-fired product was examined by X-ray diffraction, lines for Co and $RuO_2$ were observed, the latter resulting from the presence of unreacted $RuO_2$.

Example 2

Cobalt ruthenate made by the method of Example 1 was formulated into a printable thick film paste and a patterned resistor was made therefrom in the manner described above using as inorganic binder a glass frit having the composition by weight of 65% PbO, 34% $SiO_2$ and 1% $Al_2O_3$. The composition contained 6.00 g $Co_2RuO_4$, 8.80 g glass frit and 3.60 organic medium. The electrical properties of the resistor made therefrom are given in Table 1 which follows.

TABLE 1

| ELECTRICAL PROPERTIES OF $Co_2RuO_4$ RESISTORS | |
|---|---|
| Resistivity (R), kΩ/□ | 7.25 |
| σ, kΩ/□ | 0.256 |
| $CV_R$, (%) | 3.53 |
| HTCR, ppm/°C. | −6079 |
| σHTCR | 171.5 |
| $CV_{HTCR}$, (%) | −2.82 |
| Cold TCR, ppm/°C. | −16,297 |
| σCTCR | 1927.7 |
| $CV_{CTCR}$ | −11.83 |

The very highly negative TCR values show that $Co_2RuO_4$ would be an excellent negative TCR driver and would have outstanding properties as a thermistor.

Examples 3-6

In view of the highly negative TCR properties of the $Co_2RuO_4$ a series of four thick film resistor compositions was prepared therefrom in the manner described above to observe the properties of the material as a negative TCR driver at various concentration levels. The compositions of the resistor formulations and the electrical properties of the resistors prepared therefrom are given in Table 2 below. The glass composition by weight was used as in Example 2.

TABLE 2
EFFECT OF $Co_2RuO_4$
CONCENTRATION ON RESISTOR PROPERTIES

| | Example No. | | | |
|---|---|---|---|---|
| | 3 | 4 | 5 | 6 |
| | | g (%) | | |
| Composition | | | | |
| $RuO_2$ | 7.00 | 6.50 | 5.50 | 4.50 |
| Glass* | 7.50 | 7.50 | 7.50 | 7.50 |
| $Co_2RuO_4$ | 0.50 | 1.00 | 2.00 | 3.00 |
| Organic Medium | 5.00 | 5.00 | 5.00 | 5.00 |
| Resistor Properties | | | | |
| $R_{av}(\Omega/\square)$ | 6.58 | 7.28 | 9.80 | 15.74 |
| $\sigma_R(\Omega/\square)$ | ±0.050 | ±0.081 | ±0.065 | ±0.395 |
| $CV_R$ (%) | 0.764 | 1.112 | 0.33 | 1.26 |
| $HTCR_{av}$ (ppm/°C.) | +212.3 | +176.3 | −3.8 | −256.4 |
| $\sigma HTCR$ (ppm/°C.) | ±11.65 | ±8.51 | ±9.0 | ±12.3 |
| $CV_{HTCR}$ (%) | 5.49 | 4.83 | 239.7 | 4.81 |
| $CTCR_{av}$ (ppm/°C.) | +166.8 | +193.7 | +125.7 | +23.7 |
| $\sigma CTCR$ (ppm °C.) | ±5.2 | ±9.0 | ±5.8 | ±3.0 |
| $CV_{CTCR}$ (%) | 3.13 | 4.67 | 4.6 | 12.5 |

*By weight, 13.0% MnO, 41.4% PbO, 30.5% $SiO_2$, 11.7% $B_2O_3$ and 3.4% $Al_2O_3$.

The data in Table 2 show that the $Co_2RuO_4$ operates very effectively as a negative TCR driver with relatively little raising of the resistance level.

Examples 7-14

A series of eight thick film resistor compositions was formulated in which $Bi_2Ru_2O_7$ was the primary component of the functional phase and which contained from zero to 2.0% wt. $Co_2RuO_4$. The composition of the formulations and the properties of the resistors prepared therefrom are given in Table 3 below:

TABLE 3
EFFECT OF $Co_2RuO_4$ CONCENTRATION
IN RUTHENATE-BASED RESISTORS: $Bi_2Ru_2O_7$

| Example No. | 7 | 8 | 9 | 10 | 11 | 12 | 13 | 14 |
|---|---|---|---|---|---|---|---|---|
| Composition (% wt.) | | | | | | | | |
| $Bi_2Ru_2O_7$ | 30.0 | 29.9 | 29.8 | 29.6 | 29.2 | 28.8 | 28.4 | 28.0 |
| Glass | 40.0 | 40.0 | 40.0 | 40.0 | 40.0 | 40.0 | 40.0 | 40.0 |
| $Co_2RuO_4$ | — | 0.1 | 0.2 | 0.4 | 0.8 | 1.2 | 1.6 | 2.0 |
| Organic Medium | 30.0 | 30.0 | 30.0 | 30.0 | 30.0 | 30.0 | 30.0 | 30.0 |
| Resistor Properties | | | | | | | | |
| $R_{av}$ (k$\Omega/\square$) | 0.7365 | 0.7534 | 0.7591 | 0.7729 | 0.7440 | 0.7634 | 0.7671 | 0.8064 |
| $\sigma_R$ (k$\Omega/\square$) | ±0.009 | ±0.0113 | ±0.0112 | ±0.0125 | ±0.0031 | ±0.0064 | 0.0114 | 0.0155 |
| $CV_R$ (%) | 1.22 | 1.50 | 1.54 | 1.63 | 0.42 | 0.84 | 1.45 | 1.93 |
| $HTCR_{av}$ (ppm/°C.) | +180.0 | +155.4 | +139.5 | +99.1 | +76.6 | +15.7 | −16.5 | −49.6 |
| $\sigma HTCR$ (ppm/°C.) | ±4.0 | ±11.9 | ±5.1 | ±12.9 | ±13.2 | ±10.0 | ±5.7 | ±4.2 |
| $CTCR_{av}$ (ppm/°C.) | +27.2 | +6.0 | −33.8 | −70.1 | −95.8 | −157.1 | −212.8 | −252.6 |
| $\sigma CTCR$ (ppm/°C.) | ±9.4 | ±16.2 | ±12.6 | ±8.0 | ±13.0 | ±17.9 | ±15.6 | ±15.8 |
| Dry thickness (μm) | 19.8 | 19.8 | 19.3 | 19.9 | 22.0 | 22.8 | 22.2 | 21.8 |
| $R_{av}$ (k$\Omega/\square$/mil)* | 0.5834 | 0.5967 | 0.5845 | 0.6153 | 0.6547 | 0.6971 | 0.6980 | 0.7041 |

*Normalized resistance

The data in Table 3 show that the addition of the $Co_2RuO_4$ to the resistor compositions containing $Bi_2Ru_2O_7$ resulted in rather small changes in R values. However, the HTCR changes from positive to negative over the range studied. Thus, it is clear that $Co_2RuO_4$ can be used to produce resistors having preselected HTCR values.

Examples 15-22

Another series of eight thick film resistor compositions was formulated in which $Pb_2Ru_2O_{6+x}$ was the primary component of the functional phase and which contained from zero to 2.0% wt. $Co_2RuO_4$. The composition of the formulations and the properties of the resistors prepared therefrom are given in Table 4 below.

TABLE 4
EFFECT OF $Co_2RuO_4$ CONCENTRATION
IN RUTHENATE-BASED RESISTORS: $Pb_2Ru_2O_{6+x}$

| Example No. | 15 | 16 | 17 | 18 | 19 | 20 | 21 | 22 |
|---|---|---|---|---|---|---|---|---|
| Composition (% wt.) | | | | | | | | |
| $Pb_2Ru_2O_{6+x}$ | 30.0 | 29.9 | 29.8 | 29.6 | 29.2 | 28.8 | 28.4 | 28.0 |
| Glass | 40.0 | 40.0 | 40.0 | 40.0 | 40.0 | 40.0 | 40.0 | 40.0 |
| $Co_2RuO_4$ | — | 0.1 | 0.2 | 0.4 | 0.8 | 1.2 | 1.6 | 2.0 |
| Organic Medium | 30.0 | 30.0 | 30.0 | 30.0 | 30.0 | 30.0 | 30.0 | 30.0 |
| Resistor Properties | | | | | | | | |
| $R_{av}$ (k$\Omega/\square$) | 4.1361 | 4.6007 | 5.0837 | 5.8762 | 5.7446 | 6.2160 | 6.4584 | 6.4049 |
| $\sigma_R$ (k$\Omega/\square$) | ±0.0036 | ±0.0394 | ±0.0813 | ±0.0529 | ±0.1237 | ±0.0745 | ±0.1015 | ±0.0767 |
| $CV_R$ (%) | 0.88 | 0.86 | 1.60 | 0.90 | 2.15 | 1.20 | 1.57 | 1.20 |

TABLE 4-continued

EFFECT OF $Co_2RuO_4$ CONCENTRATION IN RUTHENATE-BASED RESISTORS: $Pb_2Ru_2O_{6+x}$

| Example No. | 15 | 16 | 17 | 18 | 19 | 20 | 21 | 22 |
|---|---|---|---|---|---|---|---|---|
| $HTCR_{av}$ (ppm/°C.) | +364.5 | +321.7 | +311.6 | +261.3 | +222.8 | +186.4 | +152.9 | +132.7 |
| $\sigma HTCR$ (ppm/°C.) | ±12.4 | ±8.4 | ±16.8 | ±11.0 | ±17.6 | ±5.8 | ±11.8 | ±11.1 |
| $CTCR_{av}$ (ppm/°C.) | +322.2 | +297.2 | +265.9 | +201.4 | +135.4 | +77.6 | +59.2 | +40.1 |
| $\sigma CTCR$ (ppm/°C.) | ±13.4 | ±11.5 | ±10.3 | ±9.5 | ±22.4 | ±19.8 | ±8.5 | ±16.7 |
| Dry thickness (μm) | 21.1 | 20.2 | 19.6 | 21.0 | 22.3 | 22.3 | 22.5 | 23.0 |
| $R_{av}$ (kΩ/□/mil)* | 3.4909 | 3.7174 | 3.9856 | 4.9360 | 5.1311 | 5.5521 | 5.8126 | 5.6625 |

*Normalized resistance

The data in Table 4 show that the addition of $Co_2RuO_4$ to the resistor composition containing $Pb_2Ru_2O_{6+x}$ resulted in somewhat greater changes in R values. Nevertheless, the R value increases were still quite small as compared to conventional TCR drivers such as $TiO_2$, $Nb_2O_5$ and $MnO_2$.

Examples 23-30

A still further series of eight thick film resistor compositions was formulated in which $Cu_{0.25}Bi_{1.75}Ru_2O_{7-x}$ was the primary component of the functional phase and which contained from zero to 2.0% wt. $Co_2RuO_4$. The composition of the formulations and the properties of the resistors prepared therefrom are given in Table 5 below.

TABLE 5

EFFECT OF $Co_2RuO_4$ CONCENTRATION IN RUTHENATE-BASED RESISTORS: $Cu_{0.25}Bi_{1.75}Ru_2O_{7-x}$

| Example No. | 23 | 24 | 25 | 26 | 27 | 28 | 29 | 30 |
|---|---|---|---|---|---|---|---|---|
| Composition (% wt.) | | | | | | | | |
| $Cu_{0.25}Bi_{1.75}R_2O_{7-x}$ | 30.0 | 29.9 | 29.8 | 29.6 | 29.2 | 28.8 | 28.4 | 28.0 |
| Glass | 40.0 | 40.0 | 40.0 | 40.0 | 40.0 | 40.0 | 40.0 | 40.0 |
| $Co_2RuO_4$ | — | 0.1 | 0.2 | 0.4 | 0.8 | 1.2 | 1.6 | 2.0 |
| Organic Medium | 30.0 | 30.0 | 30.0 | 30.0 | 30.0 | 30.0 | 30.0 | 30.0 |
| Resistor Properties | | | | | | | | |
| $R_{av}$ (kΩ/□) | 0.8720 | 0.8822 | 0.8853 | 0.9069 | 0.8278 | 0.8875 | 0.9268 | 0.9771 |
| $\sigma R$ (kΩ/□) | ±0.0084 | ±0.0099 | ±0.0109 | ±0.0193 | ±0.0164 | ±0.0104 | ±0.0061 | ±0.0139 |
| $CV_R$ (%) | 1.07 | 1.13 | 1.23 | 2.13 | 1.98 | 1.18 | 0.67 | 1.43 |
| $HTCR_{av}$ (ppm/°C.) | +312.6 | +306.0 | +283.4 | +277.8 | +228.0 | +207.3 | +178.0 | +165.8 |
| $\sigma HTCR$ (ppm/°C.) | ±11.1 | ±15.6 | ±9.8 | ±6.6 | ±5.3 | ±10.2 | ±20.0 | ±12.4 |
| $CTCR_{av}$ (ppm/°C.) | +286.2 | +278.5 | +274.5 | +238.1 | +214.1 | +173.3 | +136.2 | +101.2 |
| $\sigma CTCR$ (ppm/°C.) | ±11.0 | ±5.8 | ±4.4 | ±10.5 | ±10.0 | ±9.1 | ±10.4 | ±18.2 |
| Dry thickness (μm) | 18.4 | 19.7 | 19.5 | 19.6 | 22.0 | 20.7 | 21.0 | 21.7 |
| $R_{av}$ (kΩ/□/mil)* | 0.6418 | 0.6952 | 0.6905 | 0.7110 | 0.7293 | 0.7338 | 0.7785 | 0.8470 |

*Normalized resistance

The data in Table 5 show that the addition of the $Co_2RuO_4$ to the resistor composition in which $Cu_{0.25}Bi_{1.75}Ru_2O_{7-x}$ was the primary component of the functional phase resulted in quite moderate increases in R values up to 1.2% wt. concentration, beyond which the increases in R values became substantially higher. All of the compositions studied in this series had positive HTCR and CTCR values which became less as the concentration of $Co_2RuO_4$ was increased.

Looking at all of Examples 7-30, it can be seen that the $Co_2RuO_4$ acts as the TCR driver to a different degree and manner for different ruthenium-based oxidic resistor materials. From the data for both resistance and TCR, it is evident that the $Co_2RuO_4$ acts both as a TCR driver and as part of the functional (conductive) phase.

I claim:

1. A resistor composition which is an admixture of finely divided particles of (a) 4-75% wt. ruthenium-based conductive materials, (b) 96-25% wt. nonconductive glass, and (c) 0.05-15% wt. $Co_2RuO_4$ dispersed in organic medium.

2. The composition of claim 1 in which the ruthenium-based conductive material is selected from the group consisting of $RuO_2$, compounds corresponding to the formula $(M_cBi_{2-c})(M'_dRu_{2-d})O_{7-e}$ and mixtures thereof, wherein M is at least one of the group consisting of yttrium, thallium, indium, cadmium, lead and the rare earth metals of atomic number 57-71, inclusive;

M' is at least one of platinum, titanium, chromium, rhodium and antimony;

c is a number in the range 0 to 2;

d is a number in the range 0 to about 0.5, provided that d is a number in the range 0 to 1 when M' is rhodium or more than one of platinum, and titanium; and e is a number in the range 0 to 1, being at least equal to about c/2 when M is divalent lead or cadmium.

3. The composition of claim 2 in which the conductor material is $Bi_2Ru_2O_7$.

4. The composition of claim 2 in which the conductor material is $BiPbRu_2O_{6.5}$.

5. The composition of claim 2 in which the conductor material is $Bi_{0.2}Pb_{1.8}Ru_2O_{6.1}$.

6. The composition of claim 2 in which the conductor material is $Pb_2Ru_2O_6$.

7. A resistor comprising a thin layer of the dispersion of claim 1 which has been fired to volatilize the organic medium and to effect liquid phase sintering of the glass.

8. The method of forming a resistor comprising (a) forming a patterned thin layer of the dispersion of claim 1 drying the layer and (c) firing the dried layer to effect volatilization of the organic medium and to effect liquid phase sintering of the glass.

* * * * *